(12) United States Patent
Pettersson et al.

(10) Patent No.: US 9,733,056 B2
(45) Date of Patent: Aug. 15, 2017

(54) METHOD FOR COMPENSATING LOBING BEHAVIOR OF A CMM TOUCH PROBE

(71) Applicant: HEXAGON TECHNOLOGY CENTER GMBH, Heerbrugg (CH)

(72) Inventors: Bo Pettersson, Luxembourg (LU); Pascal Jordil, Ecoteaux (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 180 days.

(21) Appl. No.: 14/857,484

(22) Filed: Sep. 17, 2015

(65) Prior Publication Data

US 2016/0084625 A1    Mar. 24, 2016

(30) Foreign Application Priority Data

Sep. 18, 2014 (EP) .................................. 14185377

(51) Int. Cl.
*G01B 5/008*  (2006.01)
*G01B 21/04*  (2006.01)

(52) U.S. Cl.
CPC ........... *G01B 5/008* (2013.01); *G01B 21/042* (2013.01); *G01B 21/045* (2013.01)

(58) Field of Classification Search
CPC .............................. G01B 21/045; G01B 5/008
USPC .................................................... 33/502, 503
See application file for complete search history.

(56) References Cited

U.S. PATENT DOCUMENTS

| 4,778,313 | A | * | 10/1988 | Lehmkuhl | ......... B23B 29/03457 |
| | | | | | 29/56.5 |
| 5,146,691 | A | | 9/1992 | McMurtry | |
| 5,253,428 | A | * | 10/1993 | McMurtry | ............. G01B 7/012 |
| | | | | | 33/558 |

(Continued)

FOREIGN PATENT DOCUMENTS

EP    1 559 990 A2    8/2005
EP    1 687 589 B1    9/2012

OTHER PUBLICATIONS

Dobosz et al., "CMM touch trigger probes testing using a reference axis", Precision Engineering, vol. 29, No. 3, Jul. 1, 2005, pp. 281-289.

(Continued)

*Primary Examiner* — G. Bradley Bennett
(74) *Attorney, Agent, or Firm* — Maschoff Brennan (57) ABSTRACT

A method for compensating a measurement error related to a measurement of a desired measuring point at an object to be measured with a coordinate measuring machine is disclosed. Some embodiments include a touch probe. Some embodiments include a method that includes providing a three dimensional reference body of known shape and dimension at a known position in the measuring volume of the coordinate measuring machine, defining multiple reference points to be measured at the reference body, touching the reference body with the touch probe in defined touching directions according to the multiple reference points and thereby determining positions for the multiple reference points, and deriving a lobing error information for the touch probe based on the known shape and dimensions of the reference body and the determined positions of the reference points, the lobing error information providing error values related to respective touching directions for the touch probe.

20 Claims, 4 Drawing Sheets

(56) References Cited

U.S. PATENT DOCUMENTS

| | | | | |
|---|---|---|---|---|
| 5,353,514 A | * | 10/1994 | McMurtry | G01B 5/012 |
| | | | | 33/558 |
| 5,657,549 A | | 8/1997 | Shen et al. | |
| 2006/0156566 A1 | * | 7/2006 | Ingram | G01B 7/28 |
| | | | | 33/554 |
| 2008/0249737 A1 | * | 10/2008 | Jordil | G01B 21/04 |
| | | | | 702/152 |
| 2014/0007441 A1 | * | 1/2014 | Pettersson | G01B 21/045 |
| | | | | 33/503 |
| 2015/0176956 A1 | * | 6/2015 | Pettersson | G01B 21/04 |
| | | | | 33/503 |
| 2015/0300798 A1 | * | 10/2015 | Pettersson | G01B 21/04 |
| | | | | 33/503 |
| 2017/0003113 A1 | * | 1/2017 | Pettersson | G01B 11/005 |

OTHER PUBLICATIONS

European Search Report dated Jun. 18, 2015 as received in Application No. 14185377.0.

Wozniak et al., "Metrological feasibilities of CMM touch trigger probes. Part I: 3D theoretical model of probe pretravel", Measurement, vol. 34, Issue 4, Dec. 2003, pp. 273-286.

Yang et al., "Error compensation of touch trigger probes", Measurement, vol. 18, No. 1, May 1, 1996, pp. 47-57.

\* cited by examiner

METHOD FOR COMPENSATING LOBING BEHAVIOR OF A CMM TOUCH PROBE

FIELD OF THE INVENTION

The present invention generally pertains to a method for compensation of measurements with a touch probe of a coordinate measuring machine (CMM) by help of information about lobing behaviour of the touch probe.

BACKGROUND

It is common practice to inspect work pieces subsequent to production on a coordinate positioning apparatus, such as a coordinate measuring machine (CMM), in order to check for correctness of predefined object parameters, like dimensions and shape of the object.

In a conventional 3-D coordinate measurement machine, a probe head is supported for movement along three mutually perpendicular axes (in directions X, Y and Z). Thereby, the probe head can be guided to any arbitrary point in space of a measuring volume of the coordinate measuring machine and the object is measurable with a measurement sensor (probe) carried by the probe head.

In a simple form of the machine a suitable transducer mounted parallel to each axis is able to determine the position of the probe head and the provided probe relative to a base of the machine and, therefore, to determine the coordinates of a measurement point on the object being approached by the probe. For providing movability of the probe head a typical coordinate measuring machine may comprise a frame structure on which the probe head is arranged and driving means for moving frame components of the frame structure relative to each other.

For measuring surface variations, both measurement principles based on use of tactile sensors and of optical sensors are known.

In general, to provide a coordinate measuring machine with high measurement precision, its frame structure is therefore usually designed to have a high static stiffness. In order to achieve a stiff and rigid machine design, the frame structure or at least parts of it, is often made of stone, such as granite. Besides all the positive effects like thermal stability and good damping properties, the granite or other stiff materials also makes the machine and the movable frame elements quite heavy. The high weight on the other side also requires high forces for a decent acceleration.

However, weight reduction is a main topic relating to the designs of coordinate measuring machines, as if the machine components are built comprising less weight (and less stiffness) faster positioning of respective components can be achieved by causing fewer force affecting the coordinate measuring machine. On the other hand the influence of machine vibrations and torsions caused by reduced stiffness and (faster) movement of the machine components increase with weight reduction of these parts. Thus, uncertainties of derived measurement values and errors occurring from such deformations and vibrations increase accordingly. Therefore, especially with view to weight reduction but also for conventional machines, an accurate error handling is an important aspect.

For both approaches (heavy and light weight) an initial calibration procedure of the respective CMM is necessary particular for determining static and repeatable errors of the respective system. For maintaining stable and accurate measuring requirements, such a calibration preferably is to be executed in defined intervals due to taking account of external influences affecting the measuring system over time, e.g. changes of environmental parameters (temperature, humidity etc.) or mechanical impacts.

The calibration of a CMM may provide an improvement of a model which describes the static and/or dynamic behaviour of the CMM under certain conditions. Thereby, current calibration parameters may be used for actualising the defined model in order to more precisely—and adapted to current conditions—describe the behaviour of the CMM.

Typically, a so called compensation map is derived by the calibration procedure, wherein the map provides a compensation of each measuring value, which is acquired by measuring a measuring point of an object. Such a map may be designed as a kind of look-up table, i.e. for every coordinate or for defined coordinate steps of each axis of the CMM a corresponding compensated value is provided and an originally measured value is replaced by the compensated one. Alternatively, specified equations are determined and the equations are applied to measured position values for calculation of corresponding corrected values, thus providing a kind of compensation map.

Exemplarily for error handling, EP 1 559 990 discloses a coordinate measuring system and method of correcting coordinates measured in a coordinate measuring machine, measuring geometrical errors while parts with various weights are mounted on the coordinate measuring machine. Compensation parameters are derived from measured results per a weight of a part and stored. A compensation parameter corresponding to a weight of a part to be measured is appropriately read out to correct measured coordinates of the part to be measured.

As a further example, EP 1 687 589 discloses a method of error compensation in a coordinate measuring machine with an articulating probe head having a surface detecting device. The surface detecting device is rotated about at least one axis of the articulating probe head during measurement. The method comprises the steps of: determining the stiffness of the whole or part of the apparatus, determining one or more factors which relate to the load applied by the articulating probe head at any particular instant and determining the measurement error at the surface sensing device caused by the load.

Furthermore, the additional influence of the type of probe and of each probe for itself (due to given variations in probe assemblies) to be used for measurements may be considered. In the following, touch probes for taking tactile measurements are addressed.

Figure 1A:
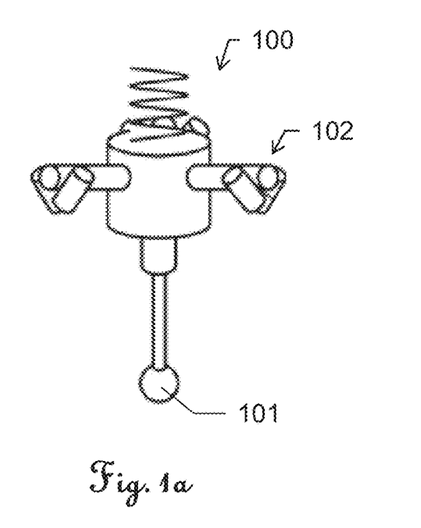
FIG. 1a-b show a touch trigger probe according to prior art and a lobing error distribution related to the probe (described above)

FIG. 1a shows a typical touch trigger probe 100 known from prior art. The probe 100 comprises a touching element with a probe tip 101 for touching an object to be measured and determining a corresponding positional coordinate of the touched point at the object. Touch trigger probes like the one of FIG. 1a are commonly used with coordinate measuring machines (CMM) to evaluate the position of the axes indicated by contact of the probe tip with the object surface. Shown is a switching sensor. The stylus is attached to a tripod structure, whose three cylindrical arms 102 are supported by three pairs of crossed cylinders. It is a kinematics mechanism, which acts on the spring, thereby restoring the stylus to its original position.

In case the stylus touches an object and thus is deflected from its origin position a signal is provided by the cylindrical structures and indicates the deflection and with that the touching of the object.

Figure 1B:
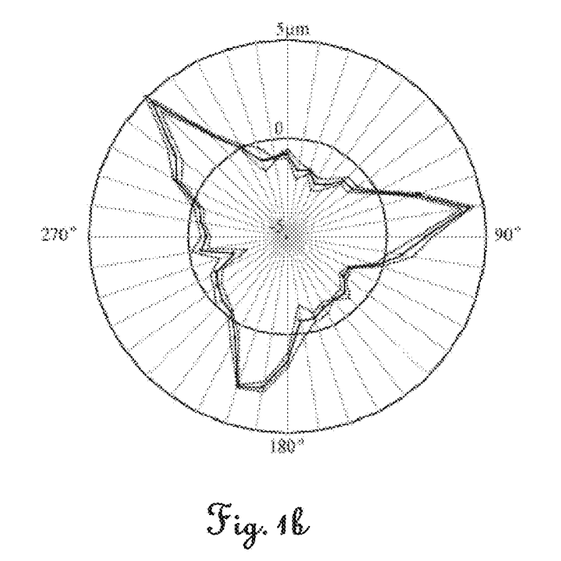

FIG. 1b shows the typical error behaviour of a probe as shown in FIG. 1a. Due to the mechanical design of the probe, the trigger force is not constant in all directions and the resulting accuracy also looks correspondingly inhomogeneous, due to the fact that the bending of the stylus is a direct function of the force. Such error typically is also called "lobing error". Here the lobing error for three directions is nearly or up to 5 μm.

The design of such probe and the behaviour of their lobing error are already known e.g. from Marek Dobosz and Adam Wozniak, "CMM touch trigger probes testing using a reference axis", Precision Engineering 29 (2005) 281-289, or from A. Wozniak, M. Dobosz, "Metrological feasibilities of CMM touch trigger probes. Part I: 3D theoretical model of probe pretravel", Measurement 34 (2003) 273-286.

In most use cases, today, the lobing error is considered to be constant in all directions, what is a quite strong limitation. An almost perfect reference sphere is used as a reference body to be measured for calibration and several points are measured around its equator, at its north pole (and sometimes in some other locations in between). The collected points are then supposed to be on a perfect sphere and a quadratic regression is used to calculate the diameter of the measured reference sphere. As a diameter of the reference sphere is provided like that, the stylus diameter easily can be calculated based thereon by use of the following formula:

$$D_{stylus} = D_{measured\ sphere} - D_{reference\ sphere}$$

This equation however would be perfect in the case the touch trigger probe behaviour would be absolutely homogeneous to all its touching directions, what is not the case in the real world. As a consequence of the above described approach, the calculate value $D_{stylus}$ is used for all subsequent measurements, but as the lobing behaviour of the probe varies over the direction of touching an object, i.e. the angle of touching an object with respect to the probe, there is no exact direction-dependently compensated measuring value available. With other words, using a regression for determining the radius of the sphere and using such approximated values leads to mostly wrongly compensated measurements.

Moreover, the lobing effect can be reduced by use of a probe type which provides a more accurate triggering system (e.g. based on a piezo element). However, such probes are much more expensive than the commonly used simple probe type to which the description of above relates.

A further aspect to be considered as to possible errors to be compensated relates to the contact point between the touch probe and the surface of the object 103 to be measured. In fact, the exact contact point between the stylus tip 101 and the surface to be measured is not known. The software only assumes that the stylus motion (the speed vector 105) is perpendicular to the surface, when entering in contact. In the motorised mode (the CMM is driven with motors), when a CAD-model of the work piece is used, this can be achieved pretty accurately, but in the manual mode or when the work piece has relative big geometry errors or its location and orientation on the CMM is not exactly known, the exact contact point for a measuring point is inaccurate.

Figure 2:
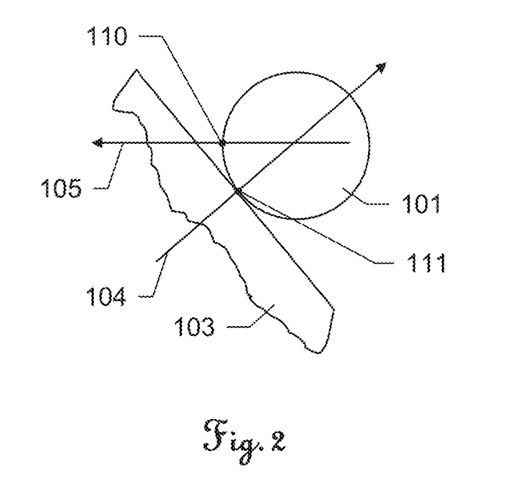
FIG. 2 shows an error occurring due to the discrepancy between a considered contact point and a real contact point according to prior art (described above)

To better understand it, FIG. 2 shows the behaviour, where both the "considered contact point" 110 and the "real contact point" 111 are represented. The speed vector 105 shows the stylus direction before hitting the surface and the force vector 104 shows the work piece reaction when entering in contact.

As can be seen, as the exact contact point is not corrected, additional errors are generated when the stylus tip 101 does not touch the surface perfectly perpendicularly.

SUMMARY

Some embodiments provide a method for more accurately compensating measuring errors induced by the above described lobing behaviour of a touch probe.

The idea of the present invention is to propose a way to compensate this typical lobing error, to reach much higher accuracy at the same cost.

Some embodiments provide a method for determining a real contact point of the touch probe when touching an object to be measured, preferably in combination with compensating the lobing effect.

The invention relates to a method for compensating a measurement error related to a measurement of a desired measuring point at an object to be measured with a coordinate measuring machine comprising a touch probe. The method comprises, particular within a sequences of calibrating the provided touch probe:

providing a three dimensional reference body of known shape and dimension at a known position in a measuring volume of the coordinate measuring machine, defining multiple reference points to be measured at the reference body, touching the reference body with the touch probe in defined touching directions according to the multiple reference points and thereby determining positions for the multiple reference points, and deriving a lobing error information for the touch probe at least based on the known shape and dimensions of the reference body (in particular additionally based on the known position of the reference body) and the determined positions of the reference points, the lobing error information providing error values related to respective touching directions for the touch probe.

According to the invention, a measurement of the desired measuring point at the object to be measured—the measurement being performed with the provided touch probe—is compensated by means of assigning a corresponding touching direction to a defined measuring direction, the measuring direction being defined by a direction of approaching the object with the touch probe, and considering the error value related to the assigned touching direction.

In particular, the measurement can be compensated by use of the error value related to the assigned touching direction.

A touch probe in context of the present invention is to be understood as any kind of probe which enables measuring of desired points at the object or at a work piece by contacting the respective object. Such touch probe may be realised by a touch trigger probe or a scanning probe as known from prior art.

The wordings "touching direction" and "measuring direction" are used within the present application for differentiating these directions where sensible or necessary. "Touching direction" mainly relates to directions which are directly assigned to the touch probe itself and are related to the way of deriving the lobing error, i.e. for instance the lobing function is provided in two dimensions (X-Y plane) and the touching direction relates to movements of the touch probe as to that plane. In contrast, the "measuring direction" would possibly be a direction which also comprises a portion in Z direction and compensation of a measurement according to that direction would also be possible by use of the lobing function related to a touching direction which corresponds only regarding the X- and Y-portion of the measuring direction. Thus, the touching direction used for compensation not necessarily needs to fully correspond to the measuring direction, wherein still good compensation of an occurring measuring error can be possible. Furthermore, the measuring direction may be identical to a direction of contacting a measuring point at the object (if the expected contact point corresponds to the real contact point) or to a direction of contacting the object, respectively.

In that context, it furthermore is to be understood that a particular touching direction could be identical with a particular measuring direction, depending on the used measuring direction and the kind (dimensions) of given lobing error information.

By use of the exact orientation of the analytical model of the lobing effect (i.e. the lobing function or the lobing error information; in particular three dimensional), all measurements correctly and individually can be precisely compensated based on the lobing information.

In general terms, the invention allows improving the accuracy of the entry-level touch trigger probes close to the level of the more advanced and much more expensive versions.

Even though the compensation of the lobbing effect always has a positive impact on the accuracy of the measurement, its impact is even stronger when using comparatively long styli or star styli.

In particular, the method is executed with the more specified steps of touching the object to be measured with the touch probe in the defined measuring direction according to the desired measuring point, wherein a positional coordinate for the desired measuring point is determined, and assigning the corresponding touching direction to the measuring direction (i.e. that touching direction related to the touch probe which corresponds best to the measuring direction, e.g. the X- and Y-direction is identical to the moving direction of the touch probe), wherein the touching direction basically corresponds to the measuring direction. Additionally, a particular error value is identified, which is related to the assigned touching direction, and the measured positional coordinate for the measuring point is compensated based on the identified error value.

A compensation of an error value can be performed by applying an algorithm which provides processing and adaptation of measuring data based on the assigned error value.

According to an embodiment of the invention, the reference points are provided with a two or three dimensional distribution with reference to the reference body. The density and the spatial distribution of the points to be measured at the reference body can be chosen e.g. depending on given measurement requirements. In general, the more reference points are defined and measured for deriving the lobing error, the more precise the lobing function can be derived and the more accurate the compensation of measurements can be performed.

In that context, in particular, the lobing error information can be derived with respect to the three dimensional distribution of the reference points, wherein the lobing error information provides a three dimensional error distribution for the touch probe, the error distribution representing respective error values related to respective touching directions. The measurement of the measuring point can be compensated based on the lobing error information and depending on the respective measuring direction for the measuring point, wherein a touching direction is assigned to the measuring direction.

The three dimensional error distribution may be represented by a calculated model of the lobing error (lobing error information, see FIG. 4), which provides respective errors for any spherical direction related to a spherical shape of the probe tip of the touch probe. Therefore, any measuring direction can be correlated to an corresponding spherical direction and compensated.

As the error information then is available for three coordinate directions X, Y and Z any measuring direction provided by a CMM can be compensated based on the error model.

In a preferred embodiment, measurements are taken on a complete sphere or half-sphere, with a higher density near the equator, as the lobing effect typically is stronger there. A best fit with a known analytical lobing function can ensure the best possible orientation extraction and generation of suitable 3D error information.

The precise modelisation, identification and localisation of the lobing effect allow its compensation in all measuring directions. The use of a mathematical lobing model allows only measuring a limited number of points to orient and scale said model. It also allows to derivate a compensation for all directions, without having to take a reference measurement for each of the used direction. This reduces the calibration time a lot.

Now referring to another embodiment of the present invention, the lobing error information is analysed regarding a magnitude of the error values as to their related touching directions, and at least one low error region with comparatively low magnitude of at least one error value for a respective touching direction is derived and at least one high error region with comparatively high magnitude of at least one error value for a respective touching direction is derived. With other words, the lobing function (2D or 3D) is analysed regarding touching directions according to which—if a measurement is taken with a corresponding measuring direction—the related lobing error is low (e.g. near to zero) and/or or comparatively high, e.g. near to the maximum of the error magnitudes. That information can be used for a kind of pre-compensation of measurements.

According to one embodiment, for measuring the desired measuring point, the object to be measured is touched with the touch probe according to a defined measuring direction which corresponds to a touching direction comprising a comparatively low magnitude of the error value. By planning a measurement like that, quite low or even no error due to lobing is related to the measurement, which initially leads to a more precise measurement (pre-compensation).

When measuring e.g. boreholes, the exact position of the measurement points usually is not specified and it would be suitable only to take points where the lobing effect is small, i.e. with measuring directions related to small error values. By doing so, the measured diameter will be much more accurate.

Thus, when measuring boreholes, the adequate choice of the measurement points allows to be minimally influenced by the lobing effect, improving the resulting accuracy.

Also in context of setting measuring points depending on the derived lobing error information, a part program can be generated and/or be adapted, the part program defines a measuring process for the object (part to be measured), so that the desired measuring point is defined in such manner that it is measured according to a measuring direction which corresponds to a touching direction of the at least one low error region.

A compensation or pre-compensation of a measurement with the touch probe is performed according to a further embodiment of the invention by assigning the corresponding touching direction to the defined measuring direction by (physically) aligning the touch probe relative to a coordinate system defined by the coordinate measuring machine so that the direction of a first main machine axis (e.g. X- or Y-Axis) corresponds to a touching direction with a comparatively low, in particular minimum, error value.

According to a more specific embodiment, the corresponding touching direction is assigned to the defined measuring direction by aligning the touch probe relative to a coordinate system defined by the coordinate measuring machine so that the directions of at least a first and a second main machine axes (X- and Y-axis) correspond to touching directions, which comprise an comparatively low, in particular minimum, error value in average. With other words, the resulting errors in X- and Y-direction are minimised.

As most of the measurements on a CMM are taken along the X and Y axis, it would make sense to physically align the probe correspondingly, in order to ensure having the minimum of the lobing effect in one or both those X and Y directions. The overall measurement quality of the CMM would be increased significantly with such alignment.

In general, a part program or measuring plan is defined, which defines the measuring points, i.e. the positions of those points, at the object and a path of moving the touch probe for approaching the measuring points. Consequently, the measuring direction according to which such a point is contacted is defined by such a plan as well.

In particular, a (digital) model of the object to be measured is provided with pre-defined measuring points, wherein the model provides information about desired shape and desired dimensions of the object, and the object is touched with the touch probe in defined measuring directions according to the pre-defined measuring points of the model.

In order to apply a lobing compensation of above the real contact point and corresponding measuring direction of touching the object must be known. As long as the object is provided at the CMM in a well defined location and orientation, the real contact point will be identical to the measuring point defined with a part program. Otherwise, i.e. if location and/or orientation of the object differs from desired values, the real contact point may also differ from the planned measuring point.

Therefore, in context of compensation lobing errors, an approach for determining the real contact point according to the invention is provided. The object is measured according to at least two different measuring points at the surface of the object, wherein desired dimensions of the surface are pre-known. Moreover, expected positional coordinates for the touched points are determined according to respective measuring directions (e.g. according to a part program) and a best-fit function is derived based on the pre-known dimensions of the surface and on the determined expected positional coordinates, the best-fit function representing the surface of the object. Additionally, the real contact points are calculated for the at least two different measuring points based on the best-fit function and a pre-known shape and dimension of a probe tip of the touch probe.

As also shown and described with FIG. 7 below, the exact contact point must be considered due to the driven measuring direction and the location of the object. So, when measuring a plane at the object, the contact points must be calculated again as soon as the exact location of the feature (object) is known. The same applies for sure for all types of objects, especially spheres, cylinders and cones.

The precise determination of the real contact points reduces the measurement errors, especially when the feature is not there where it is expected. In some applications, the exact location of the feature is no very critical, but its shape is of big interest. In those cases, it is quite disadvantageous if the measurement results are negatively influenced by an inaccurate feature positioning. This is for example the case in the aerospace industry, when looking at boreholes for bolts: their diameters and circularities need to be quite accurate to ensure a quality mechanical connection, but their localisation is less critical.

In particular, the measurements on the reference sphere are very critical, as their results will influence all other subsequent measurements, because the radius of the stylus is used every time. In that context, the determination of the real contact points allows a new calculation of the reference sphere (body) diameter and location, what again request a new calculation of the exact reference points. This may become an iterative process that converges however very fast, as all measurements already are quite accurate in the first phase. Here microns errors on measurements in the range of 25 millimetres are typical, what means relations of 1 to more than 10'000.

According to a preferred embodiment of the invention, the calculated real contact points are defined as measuring points and a compensation of the respective measurements of the defined measuring points is applied based on the measuring directions related to the real contact points and the lobing error information.

In theory, a mechanical design as showed with FIG. 1a only has a unique position, where it is stable, as is may have six points of contacts, blocking all six degrees of freedom. After triggering, such a mechanism exactly is supposed to come back to its unique rest position. However, in reality, as submicron accuracies are needed and as the surface stiffness is not infinite and as the lubrication also is not perfect, the final rest position usually also depend on the direction of the previous measurement (so called memory effect). To further improve the measurement results, two points should be taken at each location (i.e. for the same measuring point), with the same speed vector, but only the second one should be used. It also would be possible to calibrate and compensate the memory effect, measuring it for each orientation coming from all other possible orientations.

Finally, when time-of-measurement not is critical, all measurements should be doubled and only the second point should be considered to totally cancel the memory effect.

According to that, in particular, the object to be measured is touched with the touch probe in the defined measuring direction according to the desired measuring point twice or the reference body is touched in the touching direction according to one of the reference points twice, in particular twice in sequence, and a first and at least a second positional coordinate for the (same) desired measuring point or the one of the reference points are correspondingly determined. Moreover, the memory effect is determined for the defined measuring direction or touching direction by comparing the first and the at least second positional coordinate. The measurement of the desired measuring point is compensated based on the memory effect. In particular, the at least second positional coordinate is provided as resulting measuring data and/or for further processing. The first positional coordinate for the measuring point or reference point may be discarded.

According to further embodiments of the present invention, the reference body is embodied as a half-sphere, sphere or polyhedral body and/or the touch probe comprises a spherical probe tip for touching the object to be measured and the reference body and the object to be measured are touched with the probe tip.

Because of the same kind of physical imperfections, it also would make sense to determine the analytical lobing model orientation using flat surfaces with a polyhedral artefact (body), instead of using the traditional reference sphere. This also is logical, as most of the surfaces to be measured are flat, whereas the reference surfaces on the reference sphere all are curved. Friction between the stylus and the surface and the resulting exact stylus behaviour is influenced by the surface type.

All explanations given here for touch trigger probes surely can be applied to all other king of probes, for example scanning probes. In that case, the analytical model for deriving the lobing error surely needs to be adapted correspondingly, as the mechanical construction is quite different.

In some cases, the probing error contribution of the CMM can vary according to the location where the reference sphere is measured. For example, in a bridge type machine, the bending of the Z-axis is quite different when measurements are taken close to the granite (maximum Z-axis bending) and when they are gathered close to the X-axis beam on the top of the measuring volume (minimum Z-axis bending). In this case, several analytical models could be used for different locations in the measuring volume and interpolations between models for measurements located in between even could be advantageous e.g. for deriving a model, which provides a global lobing behaviour for a touch probe and the respective CMM.

In the mentioned approaches, the gravity does not play an important role, as all other forces are significantly higher, but, when considering scanning probes (as one type of a touch probe) for example, gravitation has to be considered. Its influence also would vary according to the probe orientation, when it is used on a probe head, for instance. It is also obvious that the mechanical model of the scanning probe is not the same as for a touch trigger probe, as the mechanical design is quite different, but all the points mentioned above also apply.

A further logical step as to gravitation compensation is to use dynamic models, which obviously are acceleration dependant. Here, bending, torsions or all other kind of deformations can be compensated additionally.

Thus, according to a further embodiment of the invention, the lobing error information is derived by using a particular model depending on the position of the reference body in the measuring volume and/or on a design of the touch probe and/or on a dynamic behaviour of the coordinate measuring machine (particularly depending the design of the CMM), the model providing particular error contribution and compensation due to machine parameters and/or probe parameters. By doing so, e.g. bending behaviour of the CMM as to a particular location of the reference body can be considered for deriving the lobing error. Furthermore, gravitational effects due to given dimensions, an orientation and/or mass of the touch probe as well as dynamic forces emerging by moving the touch probe or any CMM component can be considered and compensated.

The invention also relates to a coordinate measuring machine (CMM) comprising a base, a probe head with a touch probe, a machine structure with structural components for linking the probe head to the base, in particular a portal machine structure, at least one drive mechanism for providing movability of the probe head relative to the base and a controlling unit adapted for controlling movement of the touch probe. According to the invention, a processing unit is provided comprising a compensation function, the compensation function being implemented so that a measurement—performed with the touch probe—of a desired measuring point at an object to be measured is compensated on execution of the compensation function and based on a provided lobing error information by means of assigning a corresponding touching direction of the lobing error information to a defined measuring direction, the measuring direction being defined by a direction of approaching the measuring point with the touch probe, and considering an error value related to the assigned touching direction by the lobing error information.

In particular, the compensation function is implemented so that a method as described above is executable with the CMM.

The invention relates to all types of coordinate measuring machines having a touch probe and measuring a point with that probe, i.e. to a CMM being designed as parallel kinematics machine as well as to a CMM having linear or serial kinematics. Exemplarily, the CMM may be designed as bridge-type, L-bridge-type, horizontal-arm-type, cantilever-type or gantry-type machine or may be designed as articulated arm.

Each coordinate measuring machine defines a particular measuring volume, which corresponds to a volume within which an object can be measured. With other words the measuring volume corresponds to a region or zone inside of which each point is reachable to be measured with a measuring sensor (e.g. touch probe) of the CMM.

The invention also relates to a computer program product having computer-executable instructions implemented for executing and processing the steps of receiving the lobing error information and compensating measurement data of a measurement of the desired measuring point at the object to be measured performed with the touch probe according to a method (or embodiment of the method) mentioned above, in particular when run on a processing unit of a coordinate measuring machine as mentioned.

BRIEF DESCRIPTION OF THE DRAWINGS

The method and the system according to the invention are described or explained in more detail below, purely by way of example, with reference to working examples shown schematically in the drawings. Specifically.

DETAILED DESCRIPTION

Figure 3:
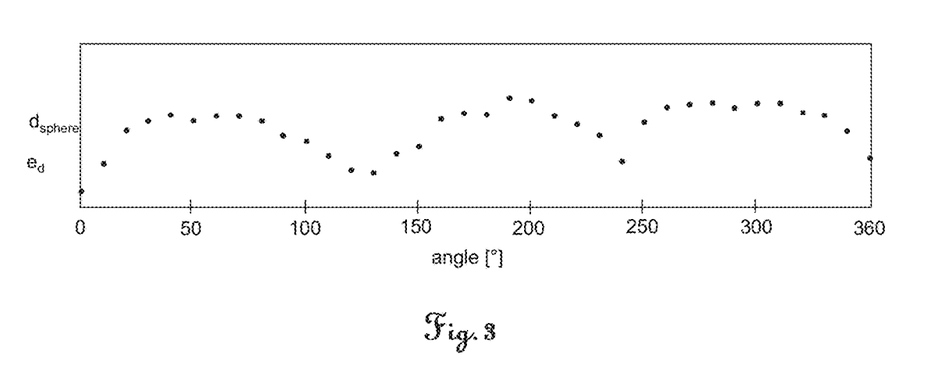
FIG. 3 shows the result of a measurement with a touch probe for a number of longitudinal angles at the equator of a reference sphere.

FIG. 3 shows the result of a measurement with a touch probe for a number of longitudinal angles at the equator of a reference sphere. The angles represent respective touching directions according to which the touch probe is approached to and finally touches the reference sphere. The result shows the measured diameter of the reference sphere ($d_{sphere}$) in relation to respective touching directions.

As can be seen from FIG. 3, the measurement comprises a typical shape regarding the lobing behaviour of a touch probe, i.e. due to three sensing units in the probe there are three local minima in the measuring curve, here approximately at 0°, 120° and 240°. In between those minima the measured diameters of the sphere differ from the minima values up to 5 µm or 6 µm.

The measuring values also represent the lobing error $e_d$ of the touch probe, which corresponds to the differences of the measured values.

According to prior art, the diameter of the sphere is defined by averaging the dimension values measured along the equator of a reference sphere. The sphere is supposed to be an ideal sphere. Based on the so defined sphere diameter, the diameter of the probe tip is calculated and/or an overall trigger point for measuring in lateral directions is derived. With other words, there is no differentiation regarding respective triggering errors depending on particular touching directions.

The idea of the present invention relates to more precisely considering occurring lobing errors for measuring desired measuring points at an object. Such more accurate compensation of measuring errors is realised by use of the measured lobing function (FIG. 3), and—in contrast to prior art—not applying any averaging over the whole sphere perimeter but additionally using the information about an actual direction of touching a desired measuring point.

Typically, in order to measure and verify dimensions and shapes of work pieces, there is a number of well defined measuring points provided by a measuring program (part program) for the respective work piece, the measuring points are e.g. assigned to critical parts of the work piece (e.g. boreholes). This also means that nominal dimensions are pre-known and should be verified by a coordinate measurement. The measuring program also defines a path according which the measuring sensor, e.g. touch trigger probe or scanning probe, is moved. Thus, a desired moving direction of the probe (for measuring a desired measuring point) relative to the object's surface is known, which in the following is called measuring direction. These preconditions are especially given when using a motorised CMM and running the measuring program basically (fully-) automated. Moreover, in case measuring of the desired measuring point is performed mainly manually, i.e. the CMM is not motorised but is embodied e.g. as a articulated arm CMM, the measuring direction is assumed to basically be perpendicular to the surface of the object.

Based on available information of above a measurement of a desired measuring point is compensated by use of the information about the related measuring direction and assigning the measuring direction to a lobing error $e_d$ represented by the lobing function (as shown in FIG. 3). As the lobing is determined with the CMM used for measuring the measuring point, the angular distribution of the lobing errors as shown in FIG. 3 already is referenced to the coordinate system of the CMM and, thus, respective touching angles are assignable to respective moving directions (e.g. according to a plane defined by the X- and the Y-axis) of the touch probe in the coordinate system. Each angel of the lobing function is related to a measuring direction, here e.g. in the X-Y plane of the CMM's coordinate system.

This means that for each measuring direction a particular touching error $e_d$ (given by the lobing function) is provided and the measurement according to that direction can be compensated based on the determined error value $e_d$. It is clearly to be understood, that an error for a direction not exactly measured for deriving the lobing function may be calculated from error values next to the respective direction (e.g. by taking an average of an error value related to direction with a little smaller angle and another value related to a little bigger angle or by fitting a curve to the measured error values).

Figure 4:
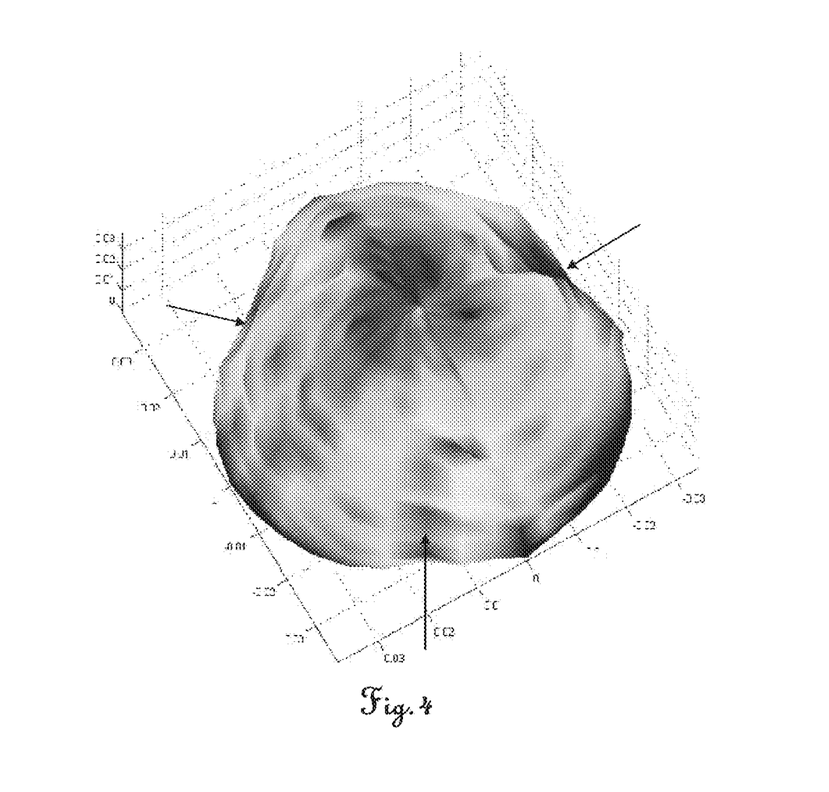
FIG. 4 shows a lobing function according to the invention derived by taking measurements of a reference sphere or half-sphere at different latitudes.

Now referring to FIG. 4, a lobing function according to the invention derived by taking measurements of a reference sphere or half-sphere at different latitudes is shown. In particular, multiple reference points are measured at the sphere according to a three dimensional distribution of the points with reference to the sphere.

The darkness and brightness of the generated error model represents areas of low and of high errors due to the respective touching directions. The darker areas marked with arrows show regions of comparatively high error values, wherein the other darker regions represent relative low errors. The areas represented more bright are of error values in between the high error regions and the low error regions.

As can be seen from FIG. 4, the lobing error at the "pole" of the sphere is quite low and in particular needs not to be compensated. Such error typically is related to a measurement with a touch probe in Z-direction. Thus, at the pole itself, the error is quite homogeneous and would not need any compensation or re-orientation, whereas on the equator, the need for a precise compensation, e.g. by re-orientating the touch probe relative to the CMM, clearly can be understood, as it reaches there e.g. about 5 µm.

Figure 5:
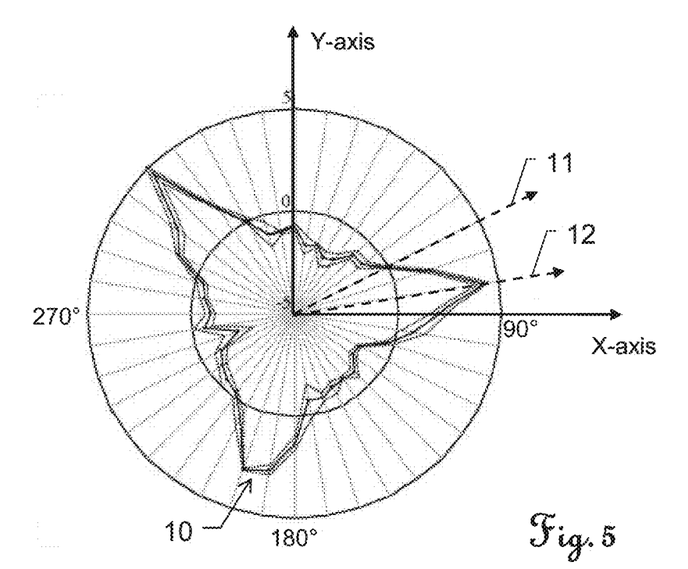
FIG. 5 shows a lobing function derived for a touch trigger probe based on measurements along an equator of a reference sphere.

FIG. 5 shows a lobing function 10 derived for a touch trigger probe based on measurements along an equator of a reference sphere. Touching of the reference sphere consequently was realised by movement of the touch probe in a X-Y plane. The present lobing function 10 represents error values in a range of about +5 µm to −5 µm distributed over 360° circumference of the probe tip.

Moreover, the orientation of the lobing function 10 with respect to the coordinate system and the main axis X and Y of the CMM is illustrated. As can be seen, the error value related to a 90° orientation of the touch probe corresponds to a positive X-axis direction of the CMM. Accordingly, the error as to the 0°-angle of the touch probe corresponds to the Y-axis of the CMM. The lobing function 10 represents touching errors due to lobing in a X-Y plane, which means that the lobing function 10 provides error information for a probe movement in such a X-Y plane (independent form a movement in Z-direction) of the CMM.

As further can be seen from FIG. 5, the lobing error values related to the X- or Y-axis differ quite strong and are of quite high magnitude, in particular regarding the X-axis.

Based on the knowledge about the lobing function 10 a measurement of a work piece—according to the invention—can be planned so that defined measuring points are approached in directions related to comparatively low, preferably minimum, error values. Such a measuring direction is depicted by the arrow 11. The lobing error according to that direction (about 63°) is more or less equal to 0. In contrast thereto, measuring a point in a direction of arrow 12 (about 81°) would need a compensation of the measured coordinate due to the high error related to that measuring direction.

In particular, a measurement program for measuring a work piece is set up based on the lobing function 10 in order to provide measurements which do not or only slightly need to be compensated for. Such measurement program can be derived fully automated based on the known nominal structure of a work piece and the lobing function 10. As a consequence, measuring points are defined so that approaching and touching with the touch probe is performed according to angular orientations of the touch probe which are related to small errors.

An alternative or additional way of compensating measurements based on the lobing function 10 is to re-align the orientation of the touch probe so that the error values related to the main CMM axes (X,Y) in average or in sum are of minimum or very low magnitude. Such embodiment contributes to compensation of measurements, as a main part of defined measuring points (according to existing measuring programs) typically are approached according to the main machine axes.

Figure 6:
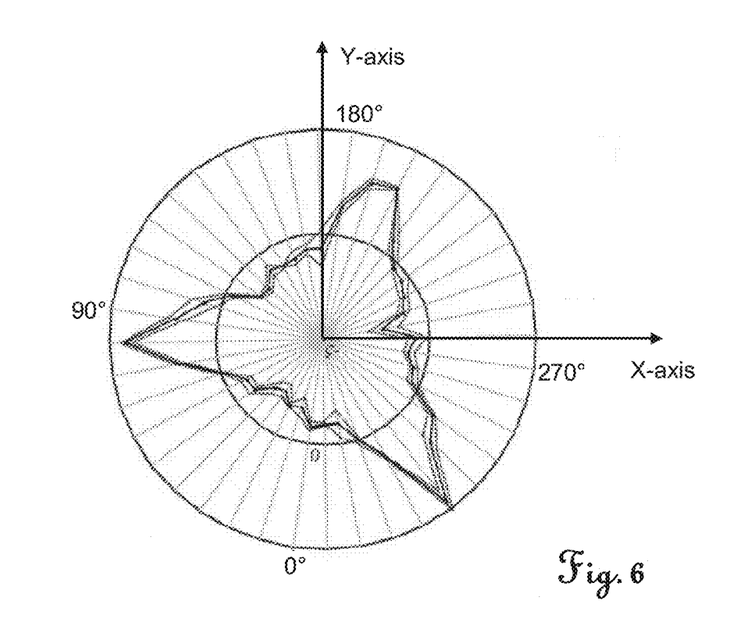
FIG. 6 shows a re-orientation of the lobing error of a touch probe relative to the coordinate system of a CMM.

Such a re-orientation of the touch probe and, thus, of the lobing related to that probe is shown in FIG. 6. The touch trigger probe was rotated around the Z-axis of the CMM in a way that the error portions in X- and Y-axis are comparatively low. As consequence, the X-axis now corresponds to an inner orientation of about 262° of the probe tip.

Figure 7:
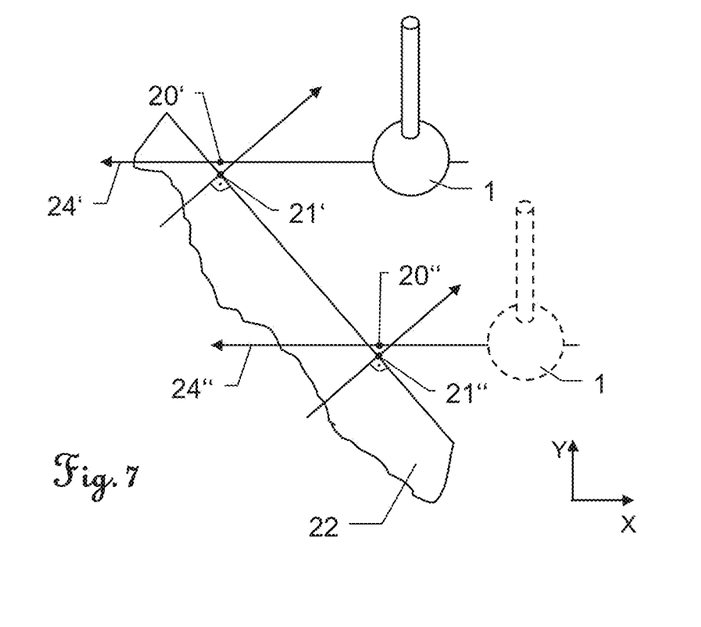
FIG. 7 shows an approach according to the invention for identifying a real contact point of the touch probe by touching a surface of a work piece of known shape.

FIG. 7 shows an approach for identifying a real contact point 21',21" of the touch probe 1 by touching a surface of a work piece 22 of known shape.

As already described in context with FIG. 2, the expected point 20',20" of touching the surface of a work piece 22 not necessarily corresponds to the real touching point 21',21". This is because of possible offsets of the actual location of the work piece 22 relative to a defined location or because of a relative work piece orientation which does not correspond to a desired orientation. In case the work piece 22 is exactly positioned at its desired measuring location in a precisely defined orientation, the contact point for a defined measuring point at the object 22 would be well known as the course of the object's surface and the moving direction for the touch probe (i.e. the measuring direction according to which the probe tip touches the surface) in the coordinate system of the CMM are well known. These desired features typically are defined by a part program (measuring program) for measuring desired measuring points for the work piece 22.

For enabling more precise measurement of the work piece 22 the real contact points 21',21" for respective measuring points have to be determined. According to the invention, such determination can be provided as shown in FIG. 7.

The touch probe 1 is approached to the object 22 along a defined speed vector 24'. Once the probe tip contacts the surface of the object 22 and such contact is recorded by the CMM and/or the touch probe itself, a position for the measuring point is derived. As can be seen, the touching of the probe tip is not realised in perpendicular direction relative to the surface. As a consequence, the measurement is triggered once the probe 1 contacts the surface at the real contact point 21'.

As the probe 1 is guided along the speed vector 24' and the point to be measured is expected to lie in that direction, coordinates for a measuring point along that vector would be derived without any compensation. Thus, the X-coordinate of the measuring point would correspond to the X-position of the real contact point 21', which does not represent the exact X-coordinate on the surface of the work piece 22. A coordinate according to an expected (but not real) contact point 20' is derived.

For determining the real contact point 21' a second measuring point at the work piece 22 is measured by touching the surface in direction of another speed vector 24". Again, the measurement is triggered when the probe tip contacts the surface at the real but not expected contact point 21". The resulting coordinates represent the expected contact point 20".

Using these at least two considered contact points 20',20" a line slope can be calculated (as an example for a surface with linear extension) and based thereon, both the real contact points 21',21" easily can be precisely extracted. The extraction of the real contact points 21',21" is performed based on the fact that the line slope for the considered contact points 20',20" is absolutely correct, whereas (still) its location is wrong and does not represent the real surface of the work piece 22. However, using the calculated line slope, there is only one corresponding line with the given slope (i.e. parallel to the calculated one), that can touch the stylus tip at the real contact points 21',21" due to the known circular or spherical shape and diameter of the probe tip. These only feasible contact points correspond to the real contact points.

Of course, there may be used further points which are measured for a work piece for such determination. Moreover, there not necessarily is to be calculated a linear slope but other shapes of fitted functions (which correspond to the known shape of the respective work piece) are possible as well.

Having calculated the real contact points 21',21" and as the related measuring directions for those contact points can be adapted as well, the lobing compensation according to the invention can be applied to the updated contact points.

Figure 8:
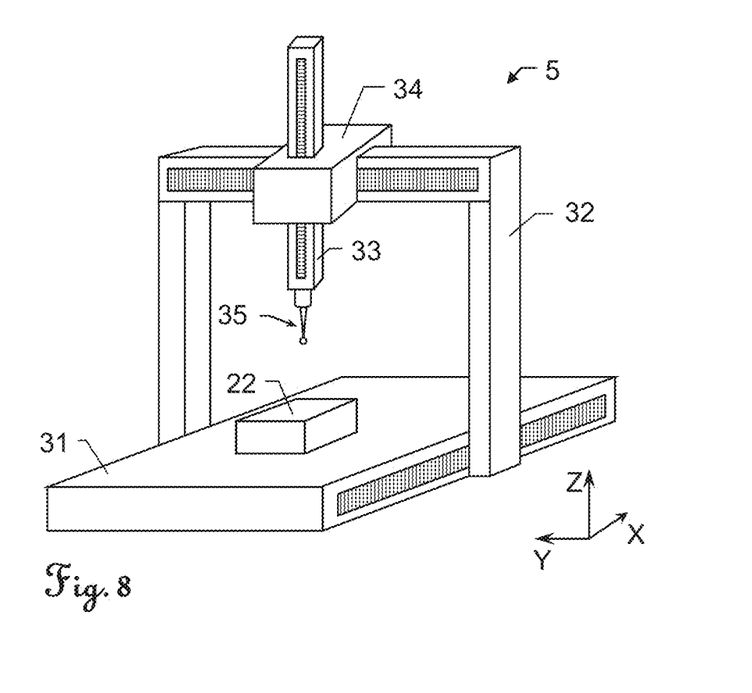
FIG. 8 shows an embodiment of a portal coordinate measuring machine (CMM) according to the invention.

In FIG. 8 an embodiment of a portal coordinate measuring machine 5 (CMM) according to the invention is depicted, the coordinate measuring machine 5 comprises a base 31 and a frame structure for linking a probe head with a touch probe 35 to the base 31, the frame structure comprising several frame components 32,33,34 being movable with respect to another. The first frame component 32 is a portal having two portal legs, which are connected by a bridging portion at their upper ends. Driven by a drive mechanism (not shown), the frame component 32 is capable to move along the longitudinal sides of the base 31. This direction corresponds to a first direction X. The movement of the frame component 32 for example may be performed by a gear rack attached to the base 31, which is meshing with a pinion on the frame component 32.

A carriage 34 is movably arranged on the bridging portion of the frame component 32. The movement of the carriage 34 (which is to bee seen as a further frame component) may also be achieved by a rack and pinion. A vertical rod 33 (sleeve, Z-ram), building a further frame component, is movably incorporated into the carriage 34. At the bottom portion of the vertical rod 33 a touch probe 35 is provided.

The touch probe 35 is movable to any desired point in a measuring volume (work zone) of the coordinate measuring machine 1 in the directions X, Y and Z. The measuring volume is defined by the base 31 and the frame components 32,33 and in particular by the range of movability of the carriage 34. The three space directions X, Y and Z are preferably orthogonal to one another, although this is not necessary for the present invention. It should be noted that a drive mechanism and a controller for driving the frame components and, thus, for driving the probe head 15 are not shown.

An object 22 to be measured is positioned in the space of the measuring volume on the base 31.

The probe head, on which a stylus 35 is arranged may alternatively embodied as an articulated probe head.

Summed up, the coordinate measuring machine 5 is built for determination of three space coordinates of a measurement point on an object 22 to be measured and, therefore, comprises three linear drive mechanisms for provision of movability of the touch probe 35 relative to the base 31 in the first, second and third direction (X, Y and Z direction) and particularly machine components providing additional rotatory degrees of freedom (e.g. articulated probe).

In the shown embodiment, the base 31 comprises a table with a granite surface plate for supporting the object 22 to be measured, on which the space coordinates of the measurement point are intended to be determined.

Not shown is a controlling and processing unit, which is designed to actuate the motor drives of the coordinate measuring machine 5 so that the touch probe 35 travels to the measurement point. The controlling and processing unit comprises a processor and a memory. In particular, the controlling and processing unit is designed for determining the three space-coordinates of the measurement point on the object 22 as a function of at least the first, the second and the third drive position of the three drive mechanisms.

For manual operation, the control unit may be connected to a user console. It is also possible for the control unit to fully automatically approach and measure measuring points of the object 22 to be measured.

Because the design of coordinate measuring machines of the generic kind as well as the design of different linear guides and different linear measuring instruments are well known to skilled persons, it must be understood that numerous modifications and combinations of different features can be made. All of these modifications lie within the scope of the invention.

Thus, the invention may generally be used with all types of coordinate measuring machines, i.e. with a CMM being designed as parallel kinematics machine as well as with a CMM having linear or serial kinematics. Exemplarily, the CMM may be designed as bridge-type, L-bridge-type, horizontal-arm-type, cantilever-type or gantry-type machine or may be designed as articulated arm.

Moreover, according to the invention, the processing unit comprises a functionality for compensating errors due to the lobing behaviour of the touch probe 35 according to the invention, i.e. as described above.

Although the invention is illustrated above, partly with reference to some specific embodiments, it must be understood that numerous modifications and combinations of different features of the embodiments can be made and that the different features can be combined with each other or with measuring principles and/or coordinate measuring machines known from prior art.

What is claimed is:

1. A method for compensating a measurement error related to a measurement of a desired measuring point at an object to be measured with a coordinate measuring machine comprising a touch probe, the method comprising:
providing a three dimensional reference body of known shape and dimension at a known position in a measuring volume of the coordinate measuring machine;
defining multiple reference points to be measured at the reference body;
touching the reference body with the touch probe in defined touching directions according to the multiple reference points and thereby determining positions for the multiple reference points;
deriving a lobing error information for the touch probe based on the known shape and dimensions of the reference body and the determined positions of the reference points, the lobing error information providing error values related to respective touching directions for the touch probe; and
compensating a measurement of the desired measuring point at the object to be measured performed with the touch probe by:
assigning a corresponding touching direction to a defined measuring direction, the measuring direction being defined by a direction of approaching the object with the touch probe, and
considering the error value related to the assigned touching direction.

2. The method according to claim 1, further comprising:
touching the object to be measured with the touch probe in the defined measuring direction according to the desired measuring point, wherein a positional coordinate for the desired measuring point is determined;
assigning the corresponding touching direction to the measuring direction, wherein the touching direction at least basically corresponds to the measuring direction;
identifying a particular error value which is related to the assigned touching direction; and
compensating the measured positional coordinate for the measuring point based on the identified error value.

3. The method according to claim 1, wherein:
the reference points are provided with a two or three dimensional distribution with reference to the reference body.

4. The method according to claim 3, further comprising:
deriving the lobing error information with respect to the three dimensional distribution of the reference points, wherein the lobing error information provides a three dimensional error distribution for the touch probe, the error distribution representing respective error values related to respective touching directions; and
compensating the measurement of the measuring point based on the lobing error information and depending on the respective measuring direction for the measuring point, wherein a touching direction is assigned to the measuring direction.

5. The method according to any one of claim 1, further comprising:
analysing the lobing error information regarding a magnitude of the error values as to their related touching directions; and
deriving at least one low error region with comparatively low magnitude of at least one error value for a respective touching direction and at least one high error region with comparatively high magnitude of at least one error value for a respective touching direction.

6. The method according to claim 5, further comprising:
touching the object to be measured with the touch probe according to a defined measuring direction which corresponds to a touching direction comprising a comparatively low magnitude of the error value.

7. The method according to claim 5, further comprising:
generating and/or adapting a part program, which defines a measuring process for the object, so that the measuring point is defined in such manner that it is measured according to a measuring direction which corresponds to a touching direction of the at least one low error region.

8. The method according to claim 1, further comprising:
assigning the corresponding touching direction to the defined measuring direction by aligning the touch probe relative to a coordinate system defined by the coordinate measuring machine so that
the direction of a first main machine axis corresponds to a touching direction with a comparatively low; or the directions of at least a first and a second main machine axes correspond to touching directions, which comprise a comparatively low error value in average.

9. The method according to claim 8, wherein the comparatively low error value comprises a minimum error value.

10. The method according to claim 1, further comprising:
touching the object according to at least two different measuring points at the surface, wherein desired dimensions of the surface are pre-known;
determining expected positional coordinates for the touched points according to respective measuring directions;
deriving a best-fit function based on the pre-known dimensions of the surface and on the determined expected positional coordinates, the best-fit function representing the surface of the object; and
calculating real contact points for the at least two different measuring points based on the best-fit function and a pre-known shape and dimension of a probe tip of the touch probe.

11. The method according to claim 9, further comprising:
defining the calculated real contact points as measuring points and
applying compensation of the respective measurements of the defined measuring points based on the measuring directions related to the real contact points and the lobing error information.

12. Method according to claim 1, further comprising:
touching the object to be measured with the touch probe in the defined measuring direction according to the desired measuring point twice;
correspondingly determining a first and at least a second positional coordinate for the desired measuring point or the one of the reference points;
deriving a memory effect for the defined measuring direction or touching direction by comparing the first and the at least second positional coordinate; and
compensating the measurement of the desired measuring point based on the memory effect,
wherein the at least second positional coordinate is provided as resulting measuring data and/or for further processing.

13. The method according to claim 12, wherein touching the object to be measured with the touch probe in the defined measuring direction according to the desired measuring point occurs twice in sequence.

14. Method according to claim 1, further comprising:
touching the reference body in the touching direction according to one of the reference points twice;
correspondingly determining a first and at least a second positional coordinate for the desired measuring point or the one of the reference points;
deriving a memory effect for the defined measuring direction or touching direction by comparing the first and the at least second positional coordinate; and
compensating the measurement of the desired measuring point based on the memory effect,
wherein the at least second positional coordinate is provided as resulting measuring data and/or for further processing.

15. The method according to claim 12, wherein touching the reference body in the touching direction according to one of the reference occurs twice in sequence.

16. The method according to claim 1, wherein:
the reference body is embodied as a half-sphere, sphere or polyhedral body;
and/or
the touch probe comprises a spherical probe tip for touching the object to be measured, and
the reference body and the object to be measured are touched with the probe tip.

17. The method according to claim 1, further comprising:
deriving the lobing error information using a particular model depending on the position of the reference body in the measuring volume and/or a design of the touch probe and/or a dynamic behaviour of the coordinate measuring machine, the model providing particular error contribution and compensation due to machine and/or probe parameters.

18. A coordinate measuring machine comprising:
a base;
a probe head with a touch probe;
a machine structure with structural components for linking the probe head to the base;
at least one drive mechanism for providing movability of the probe head relative to the base; and
a controlling unit adapted for controlling movement of the touch probe; wherein:
a processing unit comprising a compensation function, the compensation function being implemented so that a measurement—performed with the touch probe—of a desired measuring point at an object to be measured is compensated on execution of the compensation function and based on a provided lobing error information by
assigning a corresponding touching direction of the lobing error information to a defined measuring direction, the measuring direction being defined by a direction of approaching the measuring point with the touch probe, and
considering an error value related to the assigned touching direction by the lobing error information.

19. The coordinate measuring machine according to claim 18, wherein the machine structure comprises a portal machine structure.

20. A non-transitory computer program product having computer-executable instructions implemented for executing and processing the steps of:
providing a three dimensional reference body of known shape and dimension at a known position in a measuring volume of the coordinate measuring machine;
defining multiple reference points to be measured at the reference body;
touching the reference body with the touch probe in defined touching directions according to the multiple reference points and thereby determining positions for the multiple reference points;
deriving a lobing error information for the touch probe based on the known shape and dimensions of the reference body and the determined positions of the reference points, the lobing error information providing error values related to respective touching directions for the touch probe; and
compensating a measurement of the desired measuring point at the object to be measured performed with the touch probe by:
assigning a corresponding touching direction to a defined measuring direction, the measuring direction being defined by a direction of approaching the object with the touch probe, and
considering the error value related to the assigned touching direction.

* * * * *